US012739126B2

(12) United States Patent
Shan et al.

(10) Patent No.: US 12,739,126 B2
(45) Date of Patent: Sep. 15, 2026

(54) DATA TRANSMISSION METHOD AND APPARATUS, DEVICE, SYSTEM, AND STORAGE MEDIUM

(71) Applicant: Huawei Cloud Computing Technologies Co., Ltd., Guizhou (CN)

(72) Inventors: Weihua Shan, Xi'an (CN); Chunli Zhang, Chengdu (CN)

(73) Assignee: HUAWEI CLOUD COMPUTING TECHNOLOGIES CO., LTD., Guizhou (CN)

(*) Notice: Subject to any disclaimer, the term of this patent is extended or adjusted under 35 U.S.C. 154(b) by 350 days.

(21) Appl. No.: 18/318,319

(22) Filed: May 16, 2023

(65) Prior Publication Data

US 2023/0283479 A1 Sep. 7, 2023

Related U.S. Application Data

(63) Continuation of application No. PCT/CN2020/129003, filed on Nov. 16, 2020.

(51) Int. Cl.

| | |
|---|---|
| ***H04L 9/32*** | (2006.01) |
| *G06F 21/64* | (2013.01) |
| *H04L 9/40* | (2022.01) |
| *H04L 67/06* | (2022.01) |

(52) U.S. Cl.

CPC ............ *H04L 9/3242* (2013.01); *G06F 21/64* (2013.01); *H04L 63/123* (2013.01); *H04L 63/126* (2013.01); *H04L 67/06* (2013.01)

(58) Field of Classification Search

None

See application file for complete search history.

(56) References Cited

U.S. PATENT DOCUMENTS

| | | | | |
|---|---|---|---|---|
| 8,396,063 | B1 * | 3/2013 | Venkatesh | H04B 1/707 370/535 |
| 2002/0116618 | A1 * | 8/2002 | Muratani | H04N 1/00002 713/176 |
| 2003/0126303 | A1 * | 7/2003 | Kadakia | H04L 63/126 719/313 |
| 2005/0265349 | A1 * | 12/2005 | Garg | H04L 9/3297 370/395.2 |
| 2009/0210707 | A1 * | 8/2009 | De Lutiis | H04L 63/123 713/170 |

(Continued)

FOREIGN PATENT DOCUMENTS

| | | | | |
|---|---|---|---|---|
| CN | 101485152 A | | 7/2009 | |
| CN | 101729675 A | * | 6/2010 | G06F 21/64 |

(Continued)

*Primary Examiner* — Ali H. Cheema

(74) *Attorney, Agent, or Firm* — Conley Rose, P.C.

(57) ABSTRACT

A source end obtains to-be-transmitted data, divides the to-be-transmitted data into a plurality of segments, determines a sending sequence number of each segment, generates verification information of each segment based on the segment and the sending sequence number of the segment, and then sends the plurality of segments and corresponding verification information to a destination end. In this way, the destination end may verify a received segment based on a receiving sequence number and the verification information of each segment, to determine whether a transmission exception exists in the segment in a transmission process.

19 Claims, 9 Drawing Sheets

(56) References Cited

U.S. PATENT DOCUMENTS

| | | | | |
|---|---|---|---|---|
| 2010/0265954 | A1* | 10/2010 | Pullen | H04L 12/2801<br>370/394 |
| 2010/0293377 | A1* | 11/2010 | Tardo | H04L 9/0631<br>713/168 |
| 2014/0280813 | A1* | 9/2014 | Ramachandran | H04L 67/14<br>709/223 |
| 2016/0277264 | A1* | 9/2016 | Zarn | H04L 67/025 |
| 2017/0214667 | A1* | 7/2017 | Fukuda | H04L 45/74 |
| 2017/0295019 | A1* | 10/2017 | Fukuda | H04L 63/0428 |
| 2019/0166134 | A1* | 5/2019 | Tzeng | H04L 9/3242 |
| 2021/0143941 | A1* | 5/2021 | Chendamarai Kannan | H04L 1/1854 |

FOREIGN PATENT DOCUMENTS

| | | | | | |
|---|---|---|---|---|---|
| CN | 102805887 | A | | 12/2012 | |
| CN | 102938791 | A | | 2/2013 | |
| CN | 107592655 | A | * | 1/2018 | |
| CN | 108573172 | A | * | 9/2018 | G06F 21/64 |
| CN | 110008757 | A | * | 7/2019 | G06F 8/71 |
| CN | 110299970 | A | * | 10/2019 | H04L 1/1835 |
| CN | 111314021 | A | | 6/2020 | |
| CN | 111314449 | B | * | 2/2021 | H04L 67/06 |
| WO | WO-2014085959 | A1 | * | 6/2014 | H04L 67/02 |

* cited by examiner

DATA TRANSMISSION METHOD AND APPARATUS, DEVICE, SYSTEM, AND STORAGE MEDIUM

CROSS-REFERENCE TO RELATED APPLICATIONS

This is a continuation of International Patent Application No. PCT/CN2020/129003 filed on Nov. 16, 2020. The disclosure of the aforementioned application is hereby incorporated by reference in its entirety.

TECHNICAL FIELD

This disclosure relates to the field of data security technologies, and in particular, to a data transmission method and apparatus, a device, a system, and a storage medium.

BACKGROUND

In a data communication scenario, data transmitted between a source end and a destination end during communication may be tampered with due to an attack in a transmission process. Therefore, the source end and the destination end usually use a digital signature or a hash-based message authentication code (HMAC) technology to perform signature verification on to-be-transmitted data, so as to improve reliability of the data to be transmitted between the source end and the destination end.

However, only after receiving complete to-be-transmitted data, the destination end can verify, based on a digital signature generated by the source end for the to-be-transmitted data, whether the to-be-transmitted data received by the destination end is consistent with to-be-transmitted data sent by the source end. In this case, for a large amount of to-be-transmitted data, verification efficiency of the destination end for the to-be-transmitted data is low.

SUMMARY

This disclosure provides a data transmission method, to improve verification efficiency of to-be-transmitted data. In addition, this disclosure further provides a data transmission apparatus, a device, a system, a computer-readable storage medium, and a computer program product.

According to a first aspect, this disclosure provides a data transmission method, applied to a source end. The source end may obtain to-be-transmitted data, for example, data generated by one or more applications on the source end, divide the to-be-transmitted data into a plurality of segments, determine a sending sequence number of each segment, and generate verification information of the segment based on the segment and the sending sequence number of the segment. Then, a signature apparatus may send the plurality of segments and verification information respectively corresponding to the plurality of segments to a destination end. In this way, the destination end may verify a received segment and verification information based on a receiving sequence number of each segment, so as to determine whether a transmission exception exists in each segment in a transmission process.

In this way, in a process of transmitting the plurality of segments of the to-be-transmitted data, when verifying, by using the verification information, that a transmission exception occurs in the segment, the destination end may determine that a transmission exception exists in the to-be-transmitted data, without a need to wait until transmission of the entire to-be-transmitted data is completed, so that verification efficiency of the to-be-transmitted data is effectively improved. In addition, because the verification information is generated based on the sending sequence number of the segment, and the sending sequence number does not need to be transmitted to the destination end (where the destination end may generate the verification information based on the receiving sequence number corresponding to the sending sequence number and verify the segment), the destination end may verify, based on the receiving sequence number of the segment, whether the plurality of segments in the to-be-transmitted data are tampered with, replaced, and reassembled in the transmission process. In this way, data verification efficiency is improved, and data transmission security is further improved.

The source end is a transmitter of data in a session process, and the destination end is a receiver of the data in the session process. The source end and the destination end may be implemented by hardware or software. In addition, the source end and the destination end may be implemented by hardware or software of a same type, or may be implemented by hardware or software of different types. This is not limited in this embodiment.

In a possible implementation, when the verification information is an HMAC, a process in which the source end generates the verification information of each segment may be: performing an HMAC operation on a combination of each segment, the sending sequence number of the segment, and a key, to obtain the verification information corresponding to each segment.

In an example, for each segment, the source end may perform character splicing on the segment and a sending sequence number of the segment, and perform a hash operation on the spliced data, to generate a corresponding digest. Then, the source end may encrypt the generated digest by using a prestored key, and use the encrypted ciphertext as verification information corresponding to the segment. Correspondingly, when verifying a segment, the destination end may perform character splicing on the received segment and a receiving sequence number of the segment, and perform an equivalent hash operation on the spliced data, to generate a corresponding digest. In addition, the destination end may decrypt received verification information by using a prestored key. Then, the destination end may determine whether a transmission exception exists in the segment in a transmission process by comparing whether the generated digest is consistent with the digest obtained through decryption.

In another example, for each segment, the source end may perform a hash operation on the segment by using a corresponding hash algorithm, to generate a digest corresponding to the segment. Then, the source end may perform character splicing on a prestored encryption key and a sending sequence number of the segment, and encrypt the generated digest based on a new spliced key, so that the obtained encrypted ciphertext may be used as verification information corresponding to the segment. Correspondingly, when verifying a segment, the destination end may perform character splicing on a receiving sequence number of the segment and a prestored decryption key, and decrypt received verification information based on a new spliced key, to obtain a digest. In addition, the destination end may generate a digest based on the received segment, and determine whether a transmission exception exists in the segment in a transmission process by comparing whether the generated digest is consistent with the digest obtained through decryption.

In still another example, for each segment, the source end may perform a hash operation on the segment by using a corresponding hash algorithm, to generate a digest corresponding to the segment. Then, the source end may perform character splicing on the generated digest and a sending sequence number corresponding to the segment, to obtain a new digest, and encrypt, by using a prestored key, the new spliced digest, so that the obtained encrypted ciphertext may be used as verification information corresponding to the segment. Correspondingly, when verifying a segment, the destination end may decrypt received verification information by using a prestored decryption key, and remove a sending sequence number from a digest obtained through decryption, to obtain a new digest. In addition, the destination end may perform a hash operation on the received segment to generate a corresponding digest. In this way, the destination end may determine whether a transmission exception exists in the segment in a transmission process by comparing whether the two digests are consistent.

In a possible implementation, the to-be-transmitted data may be transmitted between the source end and the destination end through a session. Before transmitting the data to the destination end, the source end may first send a current session identifier to the destination end. Then, when generating the verification information corresponding to each segment, the source end may generate the verification information of the segment based on the segment, the sending sequence number of the segment, and the session identifier. In this way, when verifying each segment, the destination end may verify the segment based on the session identifier corresponding to the segment. Therefore, in a transmission process of the segment, if segments with a same sending sequence number in two different sessions are exchanged, the destination end may verify that the currently received segment is not the segment sent by the source end, so that data communication reliability can be further improved.

In a possible implementation, the source end may send the session identifier to the destination end before sending the first segment and verification information of the first segment to the destination end, and may send, to the destination end, a request header carrying the session identifier.

Further, a request that carries the session identifier and that is sent by the source end to the destination end may further include verification information corresponding to the request header, so that the destination end may verify a received request header by using the verification information, to determine whether content carried in the received request header is tampered with in a transmission process.

In a possible implementation, when the source end sends the plurality of segments and the verification information corresponding to the plurality of segments to the destination end, the source end may send the last segment, verification information of the last segment, and an end identifier to the destination end. The end identifier indicates that transmission of the plurality of segments is completed. In this way, the destination end may determine, by using the end identifier, whether the plurality of currently received segments are all segments to be transmitted by the source end to the destination end, so that the destination end can identify in time whether the segment is truncated by an attacker in the transmission process.

In a possible implementation, before obtaining the to-be-transmitted data, the source end may first start a plurality of transmission threads, and divide an obtained to-be-transmitted resource, to obtain the plurality of to-be-transmitted data. Then, the source end may send, to the destination end through each transmission thread, a segment of at least one piece of to-be-transmitted data and verification information corresponding to the segment. In this way, the source end can transmit the to-be-transmitted data in parallel to the destination end, so that transmission efficiency of the to-be-transmitted resource between the source end and the destination end is improved.

In a possible implementation, before sending the segment of the at least one piece of to-be-transmitted data and the corresponding verification information to the destination end through each transmission thread, the source end may first send, to the destination end, a request header carrying description data, so that the destination end may determine, based on the description data of the to-be-transmitted data, that the plurality of pieces of received to-be-transmitted data belong to a same to-be-transmitted resource, and the destination end integrates the plurality of pieces of received to-be-transmitted data. The description data may include at least one of the following: an identifier of the to-be-transmitted resource and a slice range of the to-be-transmitted data. The identifier of the to-be-transmitted resource may be, for example, a file name of the to-be-transmitted resource. The slice range of the to-be-transmitted data may be, for example, a slice identifier or a slice size of the data.

In a possible implementation, the source end may further generate, based on time information and/or location information, the verification information corresponding to each segment, so that verification dimensions of the segment can be increased, thereby further improving data verification reliability.

According to a second aspect, an embodiment of this disclosure further provides a data transmission method. The method is applied to a destination end. The destination end may receive a plurality of segments and verification information corresponding to each segment from a source end. The plurality of received segments are obtained by the source end by dividing to-be-transmitted data. Then, the destination end may determine a receiving sequence number of each segment, and verify, based on the segment, the receiving sequence number of the segment, and the verification information of the segment, whether a transmission exception exists in the segment in the to-be-transmitted data.

In this way, in a process of transmitting the plurality of segments of the to-be-transmitted data, when verifying, by using the verification information, that a transmission exception occurs in the segment, the destination end may determine that a transmission exception exists in the to-be-transmitted data, without a need to wait until transmission of the entire to-be-transmitted data is completed, so that verification efficiency of the to-be-transmitted data is effectively improved. In addition, because the verification information is generated based on the sending sequence number of the segment, and the sending sequence number does not need to be transmitted to the destination end (where the destination end may generate the verification information based on the receiving sequence number corresponding to the sending sequence number and verify the segment), the destination end may verify, based on the receiving sequence number of the segment, whether the plurality of segments in the to-be-transmitted data are tampered with, replaced, and reassembled in a transmission process. In this way, data verification efficiency is improved, and data transmission security is further improved.

In a possible implementation, the verification information is an HMAC, and when verifying whether a transmission exception exists in each segment in the to-be-transmitted data, the destination end may determine, based on the segment, the receiving sequence number of the segment, a key, and the received verification information, whether a transmission exception exists in the segment in the to-be-transmitted data.

For a combination of each segment, a receiving sequence number of the segment, and a key, in an example, for each segment, the source end may perform character splicing on the segment and a sending sequence number of the segment, and perform a hash operation on the spliced data, to generate a corresponding digest. Then, the source end may encrypt the generated digest by using a prestored key, and use the encrypted ciphertext as verification information corresponding to the segment. Correspondingly, when verifying a segment, the destination end may perform character splicing on the received segment and a receiving sequence number of the segment, and perform an equivalent hash operation on the spliced data, to generate a corresponding digest. In addition, the destination end may decrypt received verification information by using a prestored key. Then, the destination end may determine whether a transmission exception exists in the segment in a transmission process by comparing whether the generated digest is consistent with a digest obtained through decryption.

In another example, for each segment, the source end may perform a hash operation on the segment by using a corresponding hash algorithm, to generate a digest corresponding to the segment. Then, the source end may perform character splicing on a prestored encryption key and a sending sequence number of the segment, and encrypt the generated digest based on a new spliced key, so that the obtained encrypted ciphertext may be used as verification information corresponding to the segment. Correspondingly, when verifying a segment, the destination end may perform character splicing on a receiving sequence number of the segment and a prestored decryption key, and decrypt received verification information based on a new spliced key, to obtain a digest. In addition, the destination end may generate a digest based on the received segment, and determine whether a transmission exception exists in the segment in a transmission process by comparing whether the generated digest is consistent with the digest obtained through decryption.

In still another example, for each segment, the source end may perform a hash operation on the segment by using a corresponding hash algorithm, to generate a digest corresponding to the segment. Then, the source end may perform character splicing on the generated digest and a sending sequence number corresponding to the segment, to obtain a new digest, and encrypt, by using a prestored key, the new spliced digest, so that the obtained encrypted ciphertext may be used as verification information corresponding to the segment. Correspondingly, when verifying a segment, the destination end may decrypt received verification information by using a prestored decryption key, and remove a sending sequence number from a digest obtained through decryption, to obtain a new digest. In addition, the destination end may perform a hash operation on the received segment to generate a corresponding digest. In this way, the destination end may determine whether a transmission exception exists in the segment in a transmission process by comparing whether the two digests are consistent.

In a possible implementation, the destination end may receive, through a session, the to-be-transmitted data sent by the source end, and the destination end may further receive an identifier of the session from the source end. When verifying whether a transmission exception exists in a segment, the destination end may verify, based on each segment, a receiving sequence number of the segment, verification information of the segment, and an identifier of the current session, whether a transmission exception exists in the segment in the to-be-transmitted data. In this way, even if segments with a same sending sequence number in two different sessions are exchanged in a transmission process of the segment, the destination end may verify that the currently received segment is not the segment sent by the source end, so that data communication reliability is further improved.

In a possible implementation, the destination end may receive a request header from the source end. The request header carries an identifier of a current session between the source end and the destination end, so that the destination end can parse out the session identifier from the request header.

In a possible implementation, the destination end may receive verification information corresponding to the request header sent by the source end, so as to determine, based on the verification information corresponding to the request header, whether content carried in the request header is tampered with in the transmission process.

In a possible implementation, in a process of receiving the plurality of segments and the verification information corresponding to each segment from the source end, the destination end may receive, from the source end, the last segment, verification information of the last segment, and an end identifier. The end identifier indicates that transmission of the plurality of segments is completed. In this way, the destination end may determine, by using the end identifier, whether the plurality of currently received segments are all segments to be transmitted by the source end to the destination end, so that the destination end can identify in time whether the segment is truncated by an attacker in the transmission process.

In a possible implementation, when receiving the plurality of segments and the verification information corresponding to each segment from the source end, the destination end may receive a segment of at least one piece of to-be-transmitted data and corresponding verification information that are sent by the source end through each transmission thread. Different transmission threads are used to transmit different to-be-transmitted data obtained by dividing a to-be-transmitted resource, so that the source end transmits the to-be-transmitted data in parallel to the destination end, thereby improving transmission efficiency of the to-be-transmitted resource between the source end and the destination end.

In a possible implementation, before receiving the segment of the at least one piece of to-be-transmitted data and the corresponding verification information that are sent by the source end through each transmission thread, the destination end may receive, from the source end, a request header carrying description information. An identifier of the to-be-transmitted resource may be, for example, a file name of the to-be-transmitted resource. A slice range of the to-be-transmitted data may be, for example, a slice identifier or a slice size of the data.

In a possible implementation, the source end may further generate, based on time information and/or location information, the verification information corresponding to each segment, so that verification dimensions of the segment can be increased, thereby further improving data verification reliability.

According to a third aspect, this disclosure provides a source end. The source end is configured to implement various modules in the data transmission method performed by the source end in any one of the first aspect or the possible implementations of the first aspect.

According to a fourth aspect, this disclosure provides a destination end. A source end is configured to implement various modules in the data transmission method performed by the destination end in any one of the second aspect or the possible implementations of the second aspect.

According to a fifth aspect, this disclosure provides a data transmission system, including a source end and a destination end. The source end is configured to perform the data transmission method in any one of the first aspect or the possible implementations of the first aspect, and the destination end is configured to perform the data transmission method in any one of the second aspect and the possible implementations of the second aspect.

According to a sixth aspect, this disclosure provides a computing device. The computing device includes a processor and a memory. The processor is configured to execute instructions stored in the memory, to perform the data transmission method performed by the source end in any one of the first aspect or the possible implementations of the first aspect.

According to a seventh aspect, this disclosure provides a computing device. The computing device includes a processor and a memory. The processor is configured to execute instructions stored in the memory, to perform the data transmission method performed by the destination end in any one of the second aspect or the possible implementations of the second aspect.

According to an eighth aspect, this disclosure further provides a computer-readable storage medium. The computer-readable storage medium stores instructions. When the instructions are run on a computer device, the computer device is enabled to perform the method according to any one of the first aspect or the implementations of the first aspect.

According to a ninth aspect, this disclosure provides a computer-readable storage medium. The computer-readable storage medium stores instructions. When the instructions are run on a computer device, the computer device is enabled to perform the method according to any one of the second aspect or the implementations of the second aspect.

According to a tenth aspect, this disclosure provides a computer program product including instructions. When the computer program product runs on a computer device, the computer device is enabled to perform the method according to any one of the first aspect or the implementations of the first aspect.

According to an eleventh aspect, this disclosure provides a computer program product including instructions. When the computer program product runs on a plurality of computer devices, the computer devices are enabled to perform the method according to any one of the second aspect or the implementations of the second aspect.

In this disclosure, based on implementations according to the foregoing aspects, the implementations may be further combined to provide more implementations.

BRIEF DESCRIPTION OF DRAWINGS

To describe the technical solutions in embodiments of this disclosure more clearly, the following briefly describes the accompanying drawings for describing embodiments. It is clear that the accompanying drawings in the following description show merely some embodiments of this disclosure, and an ordinary person skilled in the art may still derive other drawings from these accompanying drawings.

DESCRIPTION OF EMBODIMENTS

Figure 1:
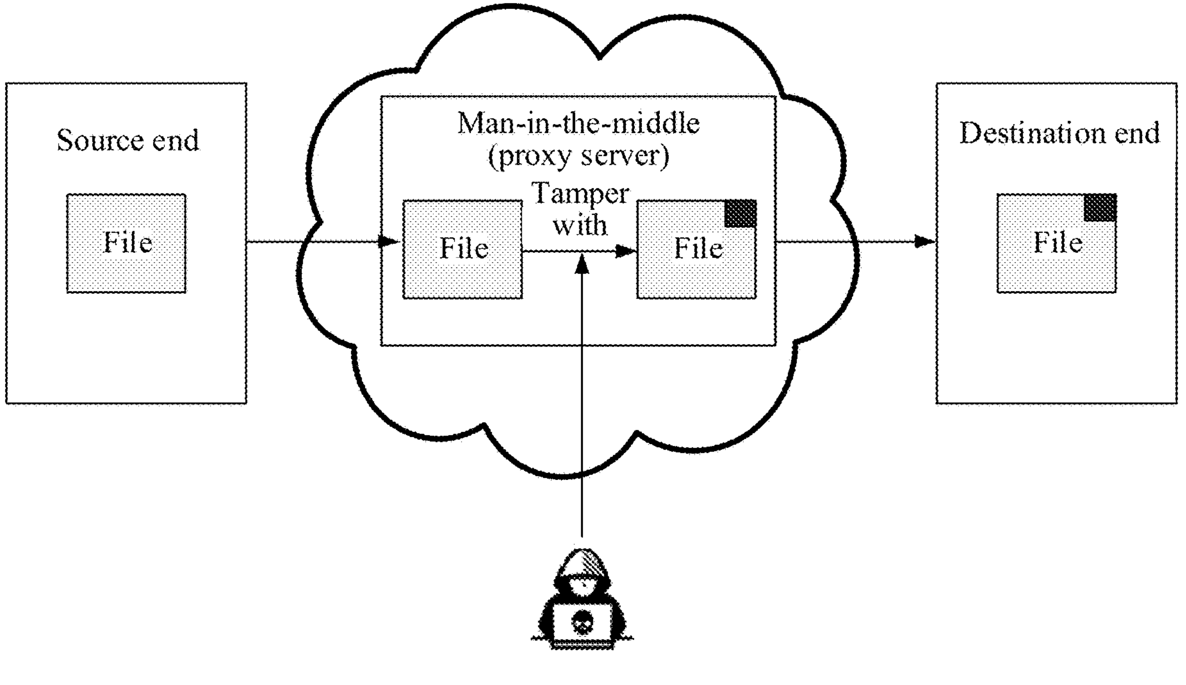
FIG. 1 is a schematic architectural diagram of an application scenario.

In actual application, when data is transmitted between a source end and a destination end, the data may suffer a man-in-the-middle attack. As a result, data (such as a file or a data stream) received by the destination end is different from data sent by the source end. As shown in FIG. 1, in a process in which a source end sends a file to a destination end over a network (Internet), a man-in-the-middle (using a proxy server) attacks the file mainly by "tampering", that is, modifying valid file segment content (namely, the file sent by the source end), for example, modifying some content to other content. In this case, content of a complete file finally received by the destination end is different from content of the original complete file sent by the source end, and reliability of communication between the source end and the destination end is affected.

Based on this, before sending a file, the source end may sign the entire file based on a digital signature or an HMAC, and send the signature and the entire file to the destination end. Then, the destination end verifies whether the received file is tampered with in a transmission process by verifying the signature, to improve the reliability of the communication between the source end and the destination end.

The digital signature, also referred to as a public key digital signature, is a digital string that can be generated only by a transmitter of information and cannot be forged by another person. The digital string is also a valid proof of authenticity of the information sent by the transmitter of the information. A set of digital signatures generally defines two complementary operations. One is used for signature, and the other is used for validation.

The HMAC is a message authentication method based on hash functions and keys. It requires two communication parties to share keys, agree on algorithms, and perform hash calculation on transmitted data, to generate an authentication code of a fixed size. The two communication parties verify the authentication code to determine validity of the transmitted data.

However, in the foregoing file verification manner, the destination end can verify whether a transmission exception occurs in the file only after receiving the complete file, and after determining that a transmission exception exists in the file, the destination end indicates the source end to resend the entire file. Therefore, a part in which no transmission exception occurs in the file still needs to be retransmitted from the source end to the destination end. This results in low file verification and transmission efficiency. Especially, when a file transmitted between the source end and a server is large, the destination end may fail to receive the complete file for a long period of time. In consideration of this, attackers may continuously send large incorrect files to consume a computing power of the destination end.

Based on this, an embodiment of this disclosure provides a data transmission method, to improve verification efficiency of data such as a file that needs to be transmitted. In a specific implementation, the source end may segment to-be-transmitted data, the source end determines a sending sequence of a plurality of segments included in the to-be-transmitted data, and generates, based on the sending sequence, verification information corresponding to each segment. Then, the source end may send the verification information and the segment to the destination end. In this way, for each received segment, the destination end may verify the segment based on a receiving sequence number of receiving the segment by the destination end and verification information corresponding to the segment, to determine whether a transmission exception occurs in the segment in a transmission process, that is, determine whether a transmission exception occurs in the to-be-transmitted data in a transmission process.

In this way, in a data transmission process, the destination end may determine a segment with a transmission exception in time, and perform verification without a need to wait until transmission of the entire to-be-transmitted data is completed, so that data verification efficiency is improved. In addition, because the verification information is generated based on the sending sequence number of the segment, and the sending sequence number does not need to be transmitted to the destination end (where the destination end may generate the verification information based on the receiving sequence number corresponding to the sending sequence number and verify the segment), the destination end may verify, based on the receiving sequence number of the segment, whether the plurality of segments in the to-be-transmitted data are tampered with, replaced, and reassembled in the transmission process. In this way, data verification efficiency is improved, and data transmission security is further improved.

Further, for a segment with a transmission exception determined by the destination end, the source end may retransmit only the segment to the destination end, and does not need to retransmit the entire to-be-transmitted data. Therefore, a segment with no transmission exception in the to-be-transmitted data may not need to be retransmitted to the destination end, so that data transmission efficiency can be improved.

The following describes embodiments of this disclosure with reference to the accompanying drawings.

In the specification and accompanying drawings of this disclosure, the terms "first", "second", and so on are intended to distinguish between similar objects but do not necessarily indicate a specific order or sequence. It should be understood that the terms used in such a way are interchangeable in proper circumstances, which is merely a discrimination manner that is used when objects having a same attribute are described in embodiments of this disclosure.

Figure 2:
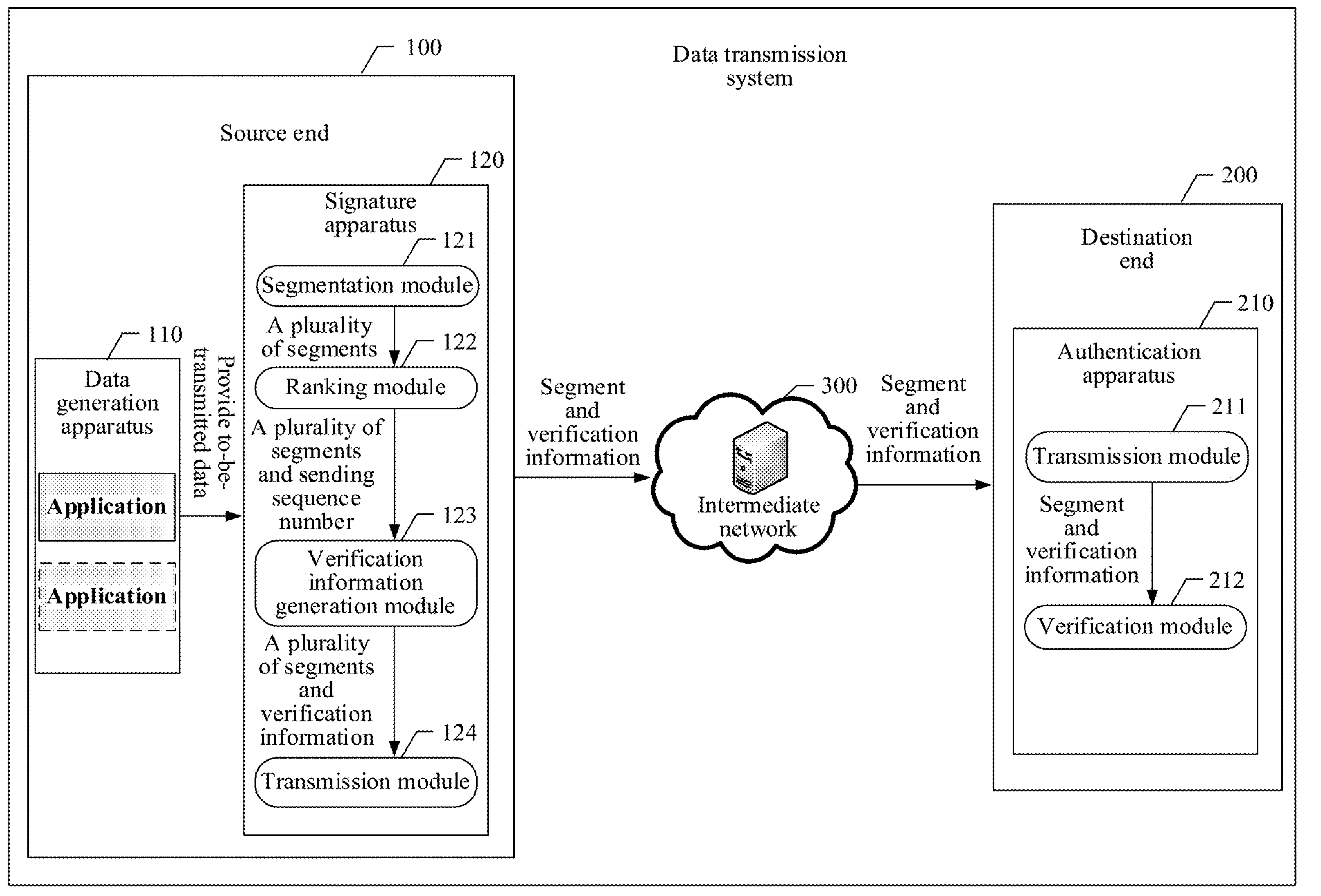
FIG. 2 is a schematic architectural diagram of a data transmission system according to an embodiment of this disclosure.

Refer to a schematic structural diagram of a data transmission system shown in FIG. 2. The data transmission system includes a source end 100 and a destination end 200. The source end 100 and the destination end 200 communicate with each other over an intermediate network 300. The source end 100 is a transmitter of data in a session process, and the destination end 200 is a receiver of the data in the session process. The source end 100 and the destination end 200 may be any devices having a communication capability, software modules on the devices, or the like. When the source end 100 and the destination end 200 are implemented based on hardware, the source end 100 may be a terminal that provides data, and the destination end 200 may be a server that receives the data; or the source end 100 may be a server that provides data, and the destination end 200 may be a terminal that receives the data. The source end 100 and the destination end 200 may be devices of a same type, or may be devices of different types. For example, both the source end 100 and the destination end 200 may be terminals, that is, two terminals may receive data from each other and send data to each other over the intermediate network 300; or both the source end 100 and the destination end 200 may be servers, that is, data communication is performed between two servers.

When the source end 100 and the destination end 200 are software modules on a device, the source end 100 may be a client running on a device, and the destination end 200 may be a cloud service module provided by a cloud platform. Certainly, the cloud service module may send data to the client, that is, the source end 100 is the cloud service module, and the destination end 200 is the client, or both the source end 100 and the destination end 200 are clients or cloud service modules. In an example, the source end 100 may include a data generation apparatus 110 and a signature apparatus 120. The data generation apparatus 110 is configured to generate to-be-transmitted data that needs to be transmitted to the destination end 200. The signature apparatus 120 is configured to perform processing such as segmentation and signature on the to-be-transmitted data.

The data generation apparatus 110 may include one or more applications, and the signature apparatus 120 may be embedded in the application as a software development kit (SDK). Alternatively, the data generation apparatus 110 may include a plurality of applications, and the signature apparatus 120 may serve as independent application software in the source end 100, and can simultaneously process to-be-transmitted data generated by the plurality of applications.

Figure 3:
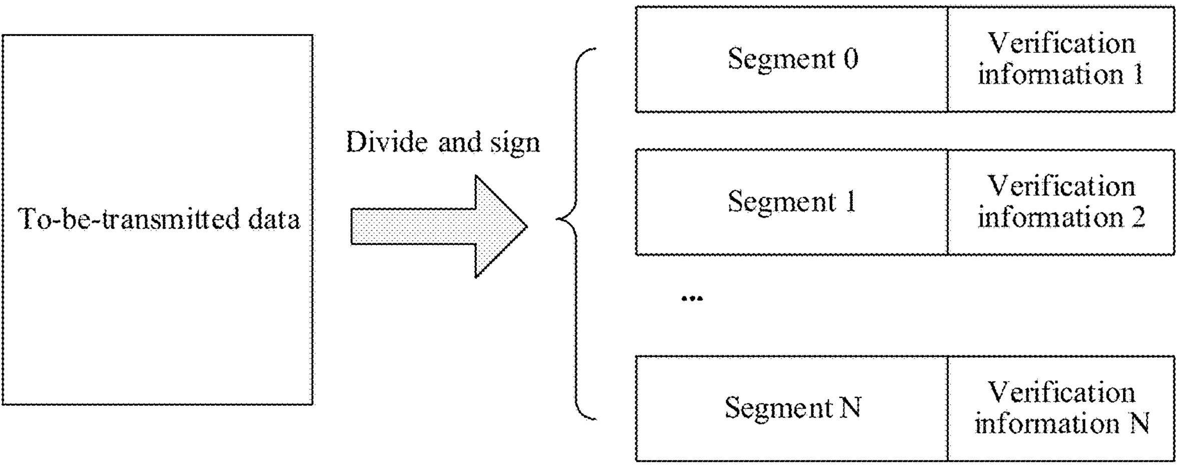
FIG. 3 is a schematic diagram of dividing to-be-transmitted data and generating verification information according to an embodiment of this disclosure.

The signature apparatus 120 includes a segmentation module 121, a ranking module 122, a verification information generation module 123, and a transmission module 124. Before transmitting data, the source end 100 may divide the to-be-transmitted data by using the segmentation module 121, to obtain a plurality of segments corresponding to the to-be-transmitted data. As shown in FIG. 3, the segmentation module 121 may divide to-be-transmitted data into N+1 segments, which are a segment 0 to a segment N. For example, the segmentation module 121 may divide the to-be-transmitted data based on a preset size, and sizes of the plurality of segments obtained through division are the same. Certainly, a size of the last segment may be less than or equal to the preset size. The preset size may be preset by a person skilled in the art or the source end to, for example, 1 megabyte (MB) or 64 kilobytes (kB). For example, for a piece of to-be-transmitted data with a size of 1024 kB, when the segmentation module 121 divides the to-be-transmitted data based on a preset size of 64 kB, 16 segments may be obtained. Alternatively, the segmentation module 121 may segment the to-be-transmitted data in another manner, for example, segment the data without using a fixed preset size. Each segment may have a different size.

After the segmentation module 121 divides the to-be-transmitted data to obtain the plurality of segments, the ranking module 122 may determine a sequence of sending the plurality of segments to the destination end 200. For example, the ranking module 122 may use an arrangement sequence number of each segment in the to-be-transmitted data as a sequence number of sending the segment to the destination end 200. For example, the ranking module 122 ranks the first segment (the first 64 kB) of the to-be-transmitted data as 1, and subsequently sends the first segment to the destination end 200 first based on the sequence number; ranks the second segment (data of the $64^{th}$ kB to the $128^{th}$ kB) of the to-be-transmitted data as 2, and subsequently sends the second segment to the destination end 200 second based on the sequence number, and so on.

In another possible example, the ranking module 122 may randomly rank the plurality of segments. For example, the source end 100 may determine a sending sequence number of each segment based on a preset random algorithm. Therefore, generally, the sequence number of sending each segment by the source end 100 is different from an arrangement sequence number of each segment in the to-be-transmitted data. In this way, even if the source end 100 is attacked when transmitting each segment, it is difficult to determine the arrangement sequence number of the segment in the to-be-transmitted data based on the sending sequence number/transmission sequence number of the segment. Therefore, it is difficult to obtain the to-be-transmitted data by reassembling the segment, and transmission security of the to-be-transmitted data is further improved.

After the ranking module 122 determines the sending sequence number for each segment, the signature apparatus 120 may generate corresponding verification information for the segment by using the verification information generation module 123. As shown in FIG. 3, for the segment 0 to the segment N obtained by the segmentation module 121 through division, the verification information generation module 123 may generate corresponding verification information 0 to verification information N based on each segment. In a specific implementation, for any segment (referred to as a target segment below) in the plurality of segments, the verification information generation module 123 may generate corresponding verification information for the target segment based on a sending sequence number of the target segment, the segment, and a key. The verification information is used for consistency verification when the target segment is subsequently transmitted to the destination end 200.

In actual application, the verification information may be a digital signature corresponding to the target segment. For example, this embodiment provides the following several manners of generating the verification information.

Manner 1: The verification information generation module 123 may perform data splicing (or combination in another manner) on the target segment and the sending sequence number, generate a digest for the spliced data content, and encrypt the digest by using a public key stored at the source end 100, to obtain the digital signature corresponding to the target segment.

Manner 2: After generating a digest for the target segment, the verification information generation module 123 performs data splicing (or combination in another manner) on the digest and the sending sequence number of the target segment, and encrypts the spliced digest by using a public key stored at the source end 100, to obtain the digital signature corresponding to the target segment.

In another possible implementation, the verification information may alternatively be, for example, an HMAC that corresponds to the target segment and that is generated based on the sending sequence number, or other data that is generated based on the sending sequence number and that can be used for consistency verification on the target segment.

Manner 3: For example, when the verification information is an HMAC, for each segment (that is, the target segment), the verification information generation module 123 may perform data slicing (or combination in another manner) on an encryption key stored at the source end 100 and the sending sequence number corresponding to the target segment to obtain a spliced key, encrypt, by using the spliced key, a digest generated based on the target segment, to obtain an HMAC corresponding to the target segment, and use the HMAC as the verification information corresponding to the target segment.

Manner 4: The verification information generation module 123 may perform data splicing on the target segment and an encryption key to obtain spliced data, and then encrypt, by using an encryption key stored at the source end 100, a digest generated based on the spliced data, to obtain an HMAC corresponding to the target segment.

Manner 5: After generating a digest based on the target segment, the verification information generation module 123 performs data slicing (or combination in another manner) on the digest and the sending sequence number corresponding to the target segment, and encrypts the spliced digest by using an encryption key stored at the source end 100, to obtain an HMAC corresponding to the target segment. Certainly, the foregoing specific implementations of generating the verification information are merely used as examples for descriptions, and are not intended to limit specific implementations of the specific implementations in actual application.

After obtaining the target segment and the verification information corresponding to the target segment, the signature apparatus 120 sends the target segment and the verification information to the destination end 200 by using the transmission module 124.

In an example, the source end 100 may establish a communication connection to the destination end 200 by using the Hypertext Transfer Protocol (HTTP) or the Hypertext Transfer Protocol Secure (HTTPS), and transmit the to-be-transmitted data to the destination end 200 through the connection over the intermediate network 300. The intermediate network 300 may split each segment and verification information corresponding to the segment that are sent by the transmission module 124 into a plurality of subsegments, and encapsulate each subsegment into an IP protocol packet by using the Internet Protocol (IP), for example, perform packet encapsulation on each subsegment based on the Transmission Control Protocol (TCP) or the User Datagram Protocol (UDP). Then, the intermediate network 300 may send each IP protocol packet corresponding to the segment to the destination end 200. Each IP protocol packet may carry a partial segment and/or (a part of or all) verification information corresponding to the segment.

In an optional solution, to improve reliability of verifying a received target segment by the destination end 200, the signature apparatus 120 does not send a sending sequence number of the target segment to the destination end 200. This avoids that the sending sequence number is stolen in a transmission process from the source end 100 to the destination end 200, and avoids affecting verification of the destination end 200 on the received target segment. For example, when an attacker tampers with transmitted target segment, the attacker may further tamper with a digital signature of the target segment based on a stolen sending sequence number.

The destination end 200 may include a transmission module 211 and a verification module 212. The transmission module 211 may be configured to receive a target segment and verification information corresponding to the target segment that are sent by the source end 100, and may further determine a receiving sequence number of the target segment and the verification information corresponding to the target segment. The receiving sequence number may be, for example, a sequence number of a segment received by the destination end 200. Then, the transmission module 211 sends the target segment, the verification information, and the receiving sequence number to the verification module 212 for data verification. The verification module 212 may verify the target segment based on the verification information, the target segment, and the receiving sequence number, to determine whether a transmission exception exists in the target segment, that is, verify whether a target segment received by the destination end 200 is consistent with the target segment sent by the source end 100.

In an example, when the verification information is a digital signature, if the signature apparatus 120 generates the data signature based on the implementation in the foregoing manner 1, when performing verification, the verification module 212 may decrypt received digital signature by using a private key stored at the destination end 200 to obtain a digest A, perform data splicing on the target segment and the receiving sequence number according to a same rule, and generate a digest B based on the spliced data content. Then, the verification module 212 compares the digest A with the digest B to determine whether the two digests are consistent. If the two digests are consistent, the verification module 212 may determine that no transmission exception exists in the target segment, that is, the target segment received by the destination end 200 is consistent with the target segment sent by the source end 100. However, if the two digests are inconsistent, the verification module 212 may determine that a transmission exception exists in the target segment, that is, the target segment received by the destination end 200 is inconsistent with the target segment sent by the source end 100. For example, content of the target segment may be tampered with, or the target segment may be replaced in a transmission process.

In another example, if the signature apparatus 120 generates the digital signature based on the foregoing manner 2, when performing verification, the verification module 212 may decrypt received digital signature by using a private key stored at the destination end 200 to obtain a digest A, and derive, from the digest A according to a rule for generating the digital signature by the source end 100, a digest B corresponding to the target segment, for example, obtain the digest B by removing the part of sending sequence number from the digest A. In addition, the verification module 212 may generate a digest C based on the received target segment. Then, the verification module 212 may compare whether the digest B is consistent with the digest C. If the digest B and the digest C are consistent, the verification module 212 may determine that no transmission exception exists in the target segment; or if the digest B and the digest C are inconsistent, the verification module 212 may determine that a transmission exception exists in the target segment. The foregoing two examples are merely used as example descriptions of a process in which the verification module 212 verifies the target segment when the verification information is a digital signature. In actual application, another implementation may also be used.

In addition, the verification information may alternatively be, for example, an HMAC that corresponds to the target segment and that is generated based on the sending sequence number, or other data that is generated based on the sending sequence number and that can be used for consistency verification on the target segment.

For example, when the verification information is an HMAC, if the signature apparatus 120 generates the HMAC based on the foregoing manner 3, for each segment (that is, the target segment), the verification module 212 performs data slicing (or combination in another manner) on a decryption key stored at the destination end 200 and a receiving sequence number corresponding to the target segment to obtain a spliced key, and then decrypts received verification information (that is, the HMAC) by using the spliced key to obtain a digest A. Then, the verification module 212 generates a digest B based on the received target segment, and compares whether the digest A is consistent with the digest B. If the two digests are consistent, the verification module 212 may determine that no transmission exception exists in the target segment. If the two digests are inconsistent, the verification module 212 may determine that a transmission exception exists in the target segment.

When the verification information is an HMAC, if the signature apparatus 120 generates the HMAC based on the foregoing manner 4, the verification module 212 may perform data slicing (or combination in another manner) on a received target segment and a receiving sequence number corresponding to the target segment, and generate a corresponding digest A based on the spliced data content. Then, the verification module 212 may decrypt received verification information by using a decryption key stored at the destination end 200 to obtain a digest B, and compare the digest A with the digest B to determine whether the two digests are consistent. If the two digests are consistent, the verification module 212 may determine that no transmission exception exists in the target segment; otherwise, determine that a transmission exception exists in the target segment.

When the verification information is an HMAC, if the signature apparatus 120 generates the HMAC based on the foregoing manner 5, the verification module 212 may decrypt received verification information by using a decryption key to obtain a digest A, and remove a receiving sequence number corresponding to the target segment from the digest A to obtain a digest B. Then, the verification module 212 may generate a digest C based on a received target segment, and compare whether the digest B is consistent with the digest C. If the digest B and the digest C are consistent, the verification module 212 may determine that no transmission exception exists in the target segment; otherwise, determine that a transmission exception exists in the target segment.

In this embodiment, any suitable implementation may be used in a specific implementation process in which the verification module 212 may verify the received target segment based on the receiving sequence number of the target segment and the received verification information. This is not limited and described in this embodiment.

Based on the foregoing process, when each segment in the to-be-transmitted data is transmitted between the source end 100 and the destination end 200, the transmitted segment may be verified according to the foregoing process. When the currently transmitted segment passes the verification, the source end 100 continues to transmit a next segment to the destination end 200. However, if the currently transmitted segment fails the verification, the destination end 200 may indicate the source end 100 to retransmit the segment, continue to verify the retransmitted segment, and start to transmit a next segment until the segment received by the destination end 200 is consistent with the segment sent by the source end 100. Because a data amount of each segment is less than a data amount of the to-be-transmitted data, verification efficiency can be effectively improved if only each transmitted segment is verified. In addition, even if a transmission exception such as replacement (that is, replacing a segment currently being transmitted with another segment), replay (that is, repeatedly sending a same segment), and sequence number recombination (that is, recombining a sequence of a plurality of segments in a transmission process) occurs in any segment in a transmission process, the destination end 200 may determine, in a timely manner by using the foregoing verification process, that a transmission exception occurs.

Further, the source end 100 may further notify the destination end 200 that transmission of the to-be-transmitted data is completed, so that the destination end 200 can determine that the plurality of currently received segments include all the segments of the to-be-transmitted data. In addition, the destination end 200 can also determine, based on whether a notification that is sent by the source end 100 and that indicates that transmission of the to-be-transmitted data is completed is received, whether a partial segment in the to-be-transmitted data is truncated by an attacker in the transmission process.

In an example implementation, after successfully transmitting all the segment of the to-be-transmitted data to the destination end 200, the source end 210 may continue to transmit a special segment to the destination end 200. The special segment is referred to as an end segment below. The end segment may carry an end identifier. The end identifier can indicate that the plurality of segments of the to-be-transmitted data have been successfully transmitted to the destination end 200. When the segmentation module 121 in the source end 100 divides the to-be-transmitted data and obtains the plurality of segments, the segmentation module 121 may further construct end segment with a size of 0, and the ranking module 122 determines that a sending sequence number of the end segment is the last. In addition, the verification information generation module 123 may generate a digital signature for the end segment based on the sending sequence number corresponding to the end segment, and then the transmission module 124 sends the end segment and the corresponding digital signature to the destination end 200. In this way, after receiving the end segment and completing verification on the end segment, the destination end 200 may determine that transmission of the plurality of segments of the to-be-transmitted data is completed. In this way, the entire to-be-transmitted data is successfully transmitted from the source end 100 to the destination end 200.

In another possible implementation, when sending a segment to the destination end 200, the source end 100 further sends an end identifier indicating whether transmission of the to-be-transmitted data ends. For example, the end identifier may be sent when the last segment and verification information corresponding to the last segment are sent. In this way, when transmitting each segment, the intermediate network 300 may generate a plurality of packets (where each packet carries partial data of the segment) based on the segment, and newly define an end indication field in a packet header (or another location in the packet). The end indication field indicates that a currently transmitted segment is the last segment, and defines a value of the end indication field in the packet header based on a value of the end identifier. For example, when the value of the end indication field is 0, it indicates that transmission of the to-be-transmitted data is not completed, or when the value of the end indication field is 1, it indicates that transmission of the to-be-transmitted data is completed. In actual application, if the segmentation module 121 divides the to-be-transmitted data into N+1 segments, in packets corresponding to the first segment to an $N^{th}$ segment that are sent by the source end 100 to the destination end 200, the value of the end indication field may be 0; in a packet corresponding to an $(N+1)^{th}$ segment that is sent by the source end 100 to the destination end 200, the value of the end indication field may be 1, which is used to notify the destination end 200 that transmission of the last segment of the to-be-transmitted data is completed.

Certainly, the foregoing examples are merely example descriptions of an implementation process in which the source end 100 notifies the destination end 200 that transmission of the to-be-transmitted data is completed. In another embodiment, the source end 100 may notify, in another manner, the destination end 200 that the transmission process of the to-be-transmitted data ends. For example, the source end 100 separately sends a transmission complete indication message to the destination end 200. The indication message carries an end identifier. This is not limited in this embodiment.

In the foregoing embodiment, the signature apparatus 120 may implement the foregoing processes of dividing the to-be-transmitted data, determining the sending sequence number, generating the verification information, and sending the segment by using a single thread. However, in actual application, the signature apparatus 120 may alternatively concurrently transmit data to the destination end 200 by using a plurality of threads, so as to improve efficiency of data transmission from the source end 100 to the destination end 200.

Figure 4:
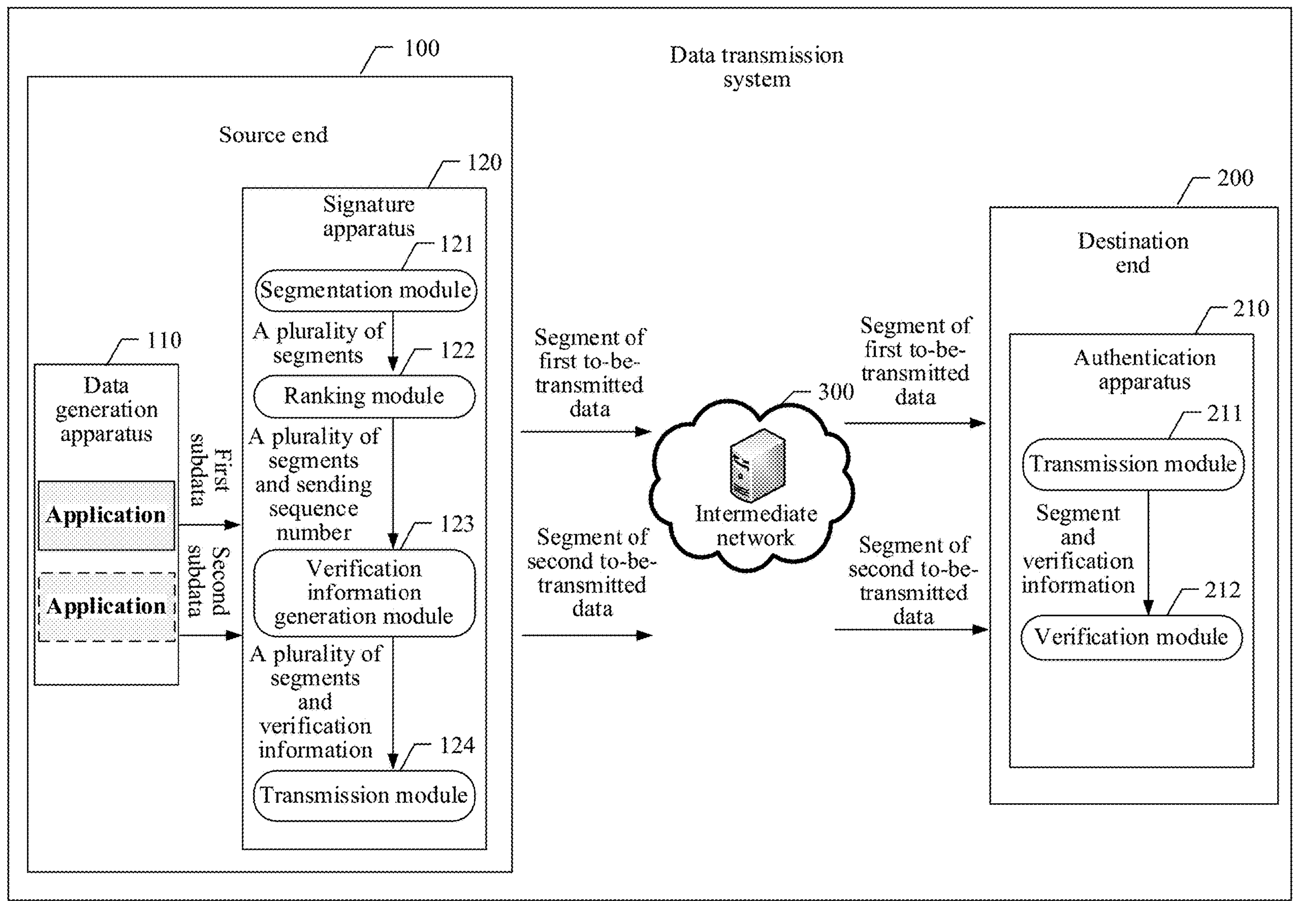
FIG. 4 is a schematic diagram of transmitting a plurality of pieces of to-be-transmitted data in parallel according to an embodiment of this disclosure.

In an example implementation, the data generation apparatus 110 may divide a to-be-transmitted resource into a plurality of pieces of to-be-transmitted data, for example, divide the to-be-transmitted resource into first to-be-transmitted data and second to-be-transmitted data, and transmit the two pieces of to-be-transmitted data to the signature apparatus 120. The signature apparatus 120 may have a plurality of threads, for example, a thread 1 and a thread 2. When signing the to-be-transmitted data, the signature apparatus 120 may process a piece of to-be-transmitted data by using each thread based on the foregoing embodiment. As shown in FIG. 4, the signature apparatus 120 divides the first to-be-transmitted data through the thread 1 to obtain a plurality of segments of the first to-be-transmitted data, further determines a sending sequence number and corresponding first verification information for each segment of the first to-be-transmitted data, and then sends the plurality of segments of the first to-be-transmitted data and the first verification information corresponding to each segment to the destination end 200 through the thread 1. The first verification information is generated based on the segment of the first to-be-transmitted data. Similarly, for the second to-be-transmitted data, the signature apparatus 120 may divide the second to-be-transmitted data through the thread 2, determine a sending sequence number, generate verification information, and send each segment of the second to-be-transmitted data and corresponding verification information to the destination end 200. The second verification information is generated based on the segment of the second to-be-transmitted data. In this embodiment, for a specific implementation process in which the signature apparatus 120 transmits the first to-be-transmitted data to the destination end 200 through the thread 1 and a specific implementation process in which the signature apparatus 120 transmits the second to-be-transmitted data to the destination end 200 through the thread 2, refer to the foregoing related descriptions. Details are not described in this embodiment again.

The source end 100 may first start a plurality of transmission threads, and then divide an obtained to-be-transmitted resource into a plurality of pieces of to-be-transmitted data, may start a plurality of transmission threads after obtaining a plurality of pieces of to-be-transmitted data through division, or may perform the two processes simultaneously. A specific execution sequence of the two processes is not limited in this embodiment.

Correspondingly, there may be at least two threads on the destination end 200. For ease of distinguishing, the threads are referred to as a thread 3 and a thread 4 below. An authentication apparatus 210 may receive, through the thread 3, each segment and verification information that correspond to the first to-be-transmitted data and that are sent by the source end 100 through the thread 1, and perform corresponding verification on the received segment. In addition, the authentication apparatus 210 may receive, through the thread 4, each segment and verification information that correspond to the second to-be-transmitted data and that are sent by the source end 220 through the thread 2, and perform corresponding verification on the received segment. For a specific implementation process in which the segment is verified through the thread 3 and the thread 4, refer to the foregoing related descriptions. Details are not described herein again.

To help the destination end 200 determine that the first to-be-transmitted data and the second to-be-transmitted data are two pieces of different to-be-transmitted data of a same to-be-transmitted resource, in some possible implementations, when sending the segment of the first to-be-transmitted data and the second to-be-transmitted data to the destination end 200, the source end 100 further sends, to the destination end 200, description data respectively corresponding to the first to-be-transmitted data and the second to-be-transmitted data. The source end 100 sends the description data of the first to-be-transmitted data to the destination end 200 through the thread 1, and sends the description data of the second to-be-transmitted data to the destination end 200 through the thread 2. In this way, when receiving the segment of the first to-be-transmitted data and the segment of the second to-be-transmitted data, the destination end 200 may determine, based on the description data of the first to-be-transmitted data and the description data of the second to-be-transmitted data, that the segment of the first to-be-transmitted data and the segment of the second to-be-transmitted data belong to a same to-be-transmitted resource, and integrate the segment of the first to-be-transmitted data and the segment of the second to-be-transmitted data to obtain the complete to-be-transmitted resource.

In an example, the description data of the first to-be-transmitted data may include, for example, an identifier (resource ID) of the to-be-transmitted resource to which the first to-be-transmitted data belongs, for example, a file name, a Uniform Resource Locator (URL), or a URL on which a hash operation is performed. Further, the description data may further include a slice range of the first to-be-transmitted data. The slice range of the first to-be-transmitted data may be, for example, a slice size or a slice identifier of the first to-be-transmitted data. The description data of the second to-be-transmitted data is similar to the description data of the first to-be-transmitted data. Details are not described herein again.

Further, when generating first verification information for each segment of the first to-be-transmitted data through the thread 1, the signature apparatus 120 may alternatively generate the first verification information based on a sending sequence number of the segment and the description data of the first to-be-transmitted data. For example, when the first verification information is a digital signature, the signature apparatus 120 may generate a digest for the segment through a thread 1, perform data splicing on the digest, the sending sequence number corresponding to the segment, and the description data of the first to-be-transmitted data, and encrypt the spliced data content, to obtain a digital signature corresponding to the segment. Correspondingly, when verifying the segment through the thread 3, the authentication apparatus 210 may decrypt verification information corresponding to the received segment through a public key, and reversely calculate a digest corresponding to the segment from data content obtained through decryption, so as to determine whether the segment received by the authentication apparatus 210 is consistent with the segment sent by the signature apparatus 120, by comparing whether the digest is consistent with the digest generated based on the received segment. Similarly, for each segment in the second to-be-transmitted data, the signature apparatus 120 may also generate second verification information corresponding to the segment through the thread 2 based on the description data of the second to-be-transmitted data and the sending sequence number corresponding to the segment. For a specific implementation, refer to the related descriptions of generating the first verification information. Details are not described herein again.

In actual application, the signature apparatus 120 may alternatively sign, through a plurality of threads at the same time, a plurality of pieces of different to-be-transmitted data provided by the data generation apparatus 110, and after completing the signing, transmit the plurality of pieces of different to-be-transmitted data and verification information in parallel to the destination end. A specific implementation process is similar to a specific implementation in which the signature apparatus 120 separately signs and transmits two pieces of to-be-transmitted data. For details, refer to the foregoing related descriptions. Details are not described herein again.

In some actual application scenarios, in a process in which the plurality of segments of the to-be-transmitted data are transmitted from the source end 100 to the destination end 200, a partial segment may be replaced by an attacker by using a segment that is of other data and that has a same sending sequence number. For example, it is assumed that a source end $A_1$ sends to-be-transmitted data a to a destination end $A_2$, and a source end $B_1$ sends to-be-transmitted data b to a destination end $B_2$ at the same time. In this case, the attacker may exchange some segments with a same sending sequence number in a process in which the source end $A_1$ and the source end $A_2$ transmit a segment. For example, it is assumed that the source end $A_1$ sequentially sends segments $a_1$, $a_2$, $a_3$, $a_4$, and $a_5$ in the to-be-transmitted data a, and the source end $A_2$ sequentially sends segments $b_1$, $b_2$, $b_3$, $b_4$, and $b_5$ in the to-be-transmitted data b. In this case, the attacker may exchange the segment $a_3$ in the to-be-transmitted data a with the segment $b_3$ in the to-be-transmitted data b. Consequently, the segment received by the destination end $A_2$ is sequentially $a_1$, $a_2$, $b_3$, $a_4$, and $a_5$, and the segment received by the destination end $B_2$ is sequentially $b_1$, $b_2$, $a_3$, $b_4$, and $b_5$. As a result, an exception exists in the data received by the destination ends $A_1$ and $A_2$.

Based on this, in a process of transmitting each segment of the to-be-transmitted data to the destination end 200, the transmission module 124 may first send, to the destination end 200, a session identifier corresponding to a target segment (that is, any one of the plurality of segments of the to-be-transmitted data). The session identifier identifies a corresponding session for transmitting the target segment. In this way, the authentication apparatus 210 of the destination end 200 may verify, based on the session identifier, whether received different segments belong to a same session, so that the different segments received by the destination end 200 belong to a same to-be-transmitted resource corresponding to the session.

The session identifier may be, for example, any one or more of a data transmission task identifier (SessionID), a request identifier (RequestID), a universally unique identifier (UUID), a random number (RandomNumber) generated for the session, a header hash (HeaderHash), or a header signature (HeaderSignature), or may be a feature combination of any one or more of the foregoing information. The combined information is used as the session identifier of the to-be-transmitted data. In this embodiment, a specific implementation of the session identifier is not limited.

Figure 5:
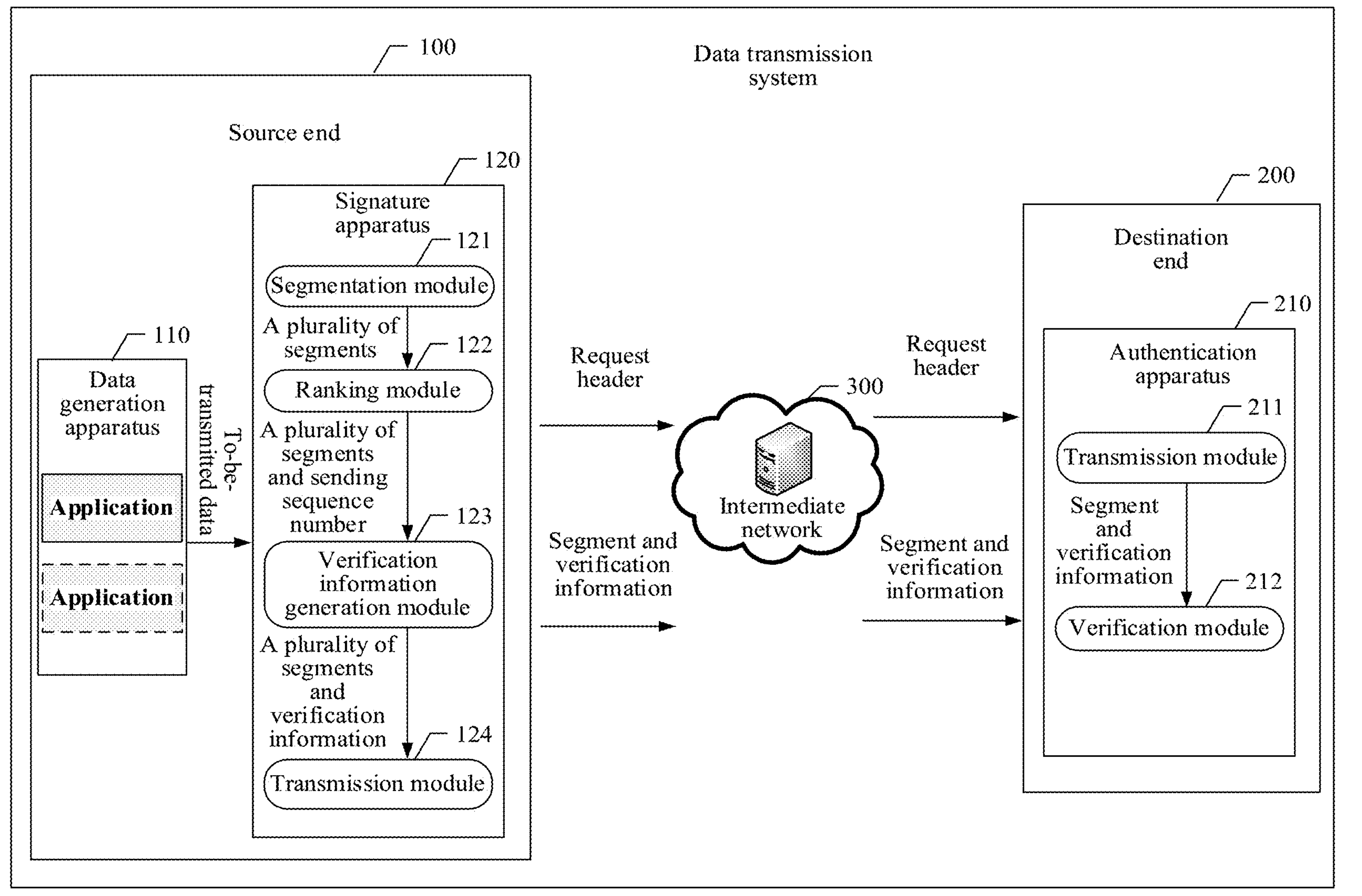
FIG. 5 is a schematic diagram of transmitting a request header from a source end to a destination end according to an embodiment of this disclosure.

In an example implementation of preventing a replacement attack, the transmission module 124 may construct a request header, for example, an HTTP protocol-based request header. The request header carries the session identifier corresponding to the to-be-transmitted data. In an example, the transmission module 124 may construct a request header shown in FIG. 6. Some fields (headers) in the request header may be for recording attribute information of the request header, for example, information such as a request type and a version number. Some other fields in the request header may be for recording the session identifier corresponding to the to-be-transmitted data, and in actual application, the fields may be redefined by using an existing field or a reserved field, so as to record the session identifier by using the fields. Then, the transmission module 124 may send the request header to the destination end 200, as shown in FIG. 5. In this way, the destination end 200 may parse out the session identifier from the received request header, and determine that a plurality of segments that are subsequently received are all transmitted through a session corresponding to the session identifier.

Correspondingly, when generating verification information for each segment in the to-be-transmitted data, the verification information generation module 123 may generate the verification information based on a sending sequence number of the segment and a session identifier corresponding to the segment (that is, a session identifier corresponding to the to-be-transmitted data to which the segment belongs). For example, when the verification information is a digital signature, the verification information generation module 123 may perform data slicing on the sending sequence number and the session identifier and a digest generated based on the segment, and encrypt the spliced data content. In this case, the obtained encrypted ciphertext may be the digital signature corresponding to the segment. Correspondingly, for each segment received by the destination end 200, the verification module 212 may verify the segment based on a session identifier and a receiving sequence number corresponding to the segment that are parsed out from the request header, so as to determine whether the segment received by the destination end 200 is consistent with the segment sent by the source end 100.

In this way, when the attacker exchanges segments of different to-be-transmitted data transmitted through different sessions, the authentication apparatus 210 (which may be the verification module 212) in the destination end 200 may determine, by using session identifiers corresponding to the segment, that the segment received by the destination end 200 is inconsistent with the segment sent by the source end 100, so as to determine that an exception occurs in the segment in a transmission process.

Figure 6:
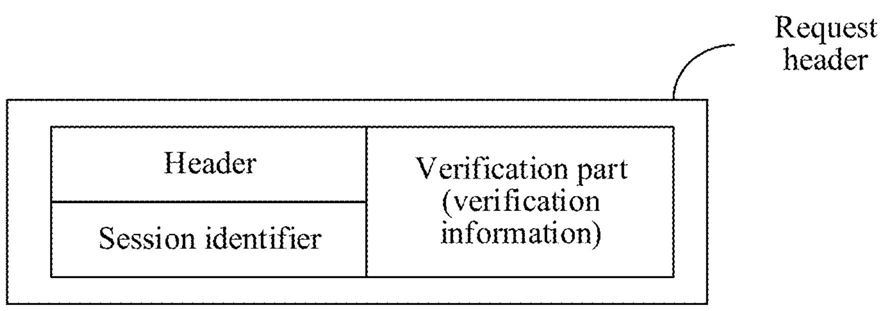
FIG. 6 is a schematic diagram of an example request header according to an embodiment of this disclosure.

In a further possible implementation, when the request header is transmitted between the source end 100 and the destination end 200, the destination end 200 may further verify the request header. The destination end 200 verifies whether a request header sent by the source end 100 is consistent with a request header received by the destination end 200, to determine whether the request header is attacked, for example, tampered with in the transmission process. For example, the verification information generation module 123 in the source end 100 may further generate verification information for a constructed request header, and add the verification information of the request header to a field of verification part in the request header, as shown in FIG. 6. In this way, after the destination end 200 receives the request header, the verification module 212 may parse out the verification information corresponding to the request header from the field of verification part in the request header, and verify content in the request header by using the verification information. The verification part may be combined with the header, or may be a field different from the header. For example, the verification part may be a tail field in the request header. A specific implementation in which the request header carries the session identifier and the verification information is not limited in this embodiment. When the verification module 212 determines that the request header received by the destination end 200 is consistent with a request header sent by the source end 100, the source end 100 may start to send each segment in the to-be-transmitted data to the destination end 200. However, when the verification module 212 determines that a transmission exception occurs in the request header received by the destination end 200, the destination end 200 may terminate a connection to the source end 100, or require the source end 100 to retransmit the request header. The source end 100 is allowed to further transmit the segment only when the request header received by the destination end 200 is consistent with the request header sent by the source end 100.

In actual application, when constructing the request header, the transmission module 124 in the source end 100 may further add more other information to the request header to enhance verification on the to-be-transmitted data received by the destination end 200. For example, the transmission module 124 may further add time information and/or location information to the request header. The time information may be, for example, a maximum allowable time difference between sending of the segment by the source end 100 and receiving of the segment by the destination end 200. Certainly, the time information may alternatively be other information suitable for verifying the segment in a time dimension. The location information may be, for example, a network location/geographical location allowed by the destination end 200 that receives the segment, or may be other information suitable for verifying the segment in a location dimension.

It should be noted that the foregoing examples are merely used for describing examples of a specific implementation in which the source end 100 and the destination end 200 jointly verify the segment, and are not intended to limit a specific implementation to the foregoing implementations. It should be understood that in actual application, the foregoing implementations may be combined with each other. For example, in another possible implementation, the request header generated by the source end 100 may not only include the session identifier and the digital signature corresponding to the request header, but also include the time information and/or the location information. Further, when the source end 100 transmits the to-be-transmitted data to the destination end 200 through a plurality of threads, each thread may generate a corresponding request header, and the request header generated by each thread may further include, for example, description data of subdata transmitted through the thread.

Based on the data transmission process described in the foregoing embodiment, an embodiment of this disclosure further provides a data transmission method. The following describes the data transmission method from a perspective of interaction between apparatuses.

Figure 7:
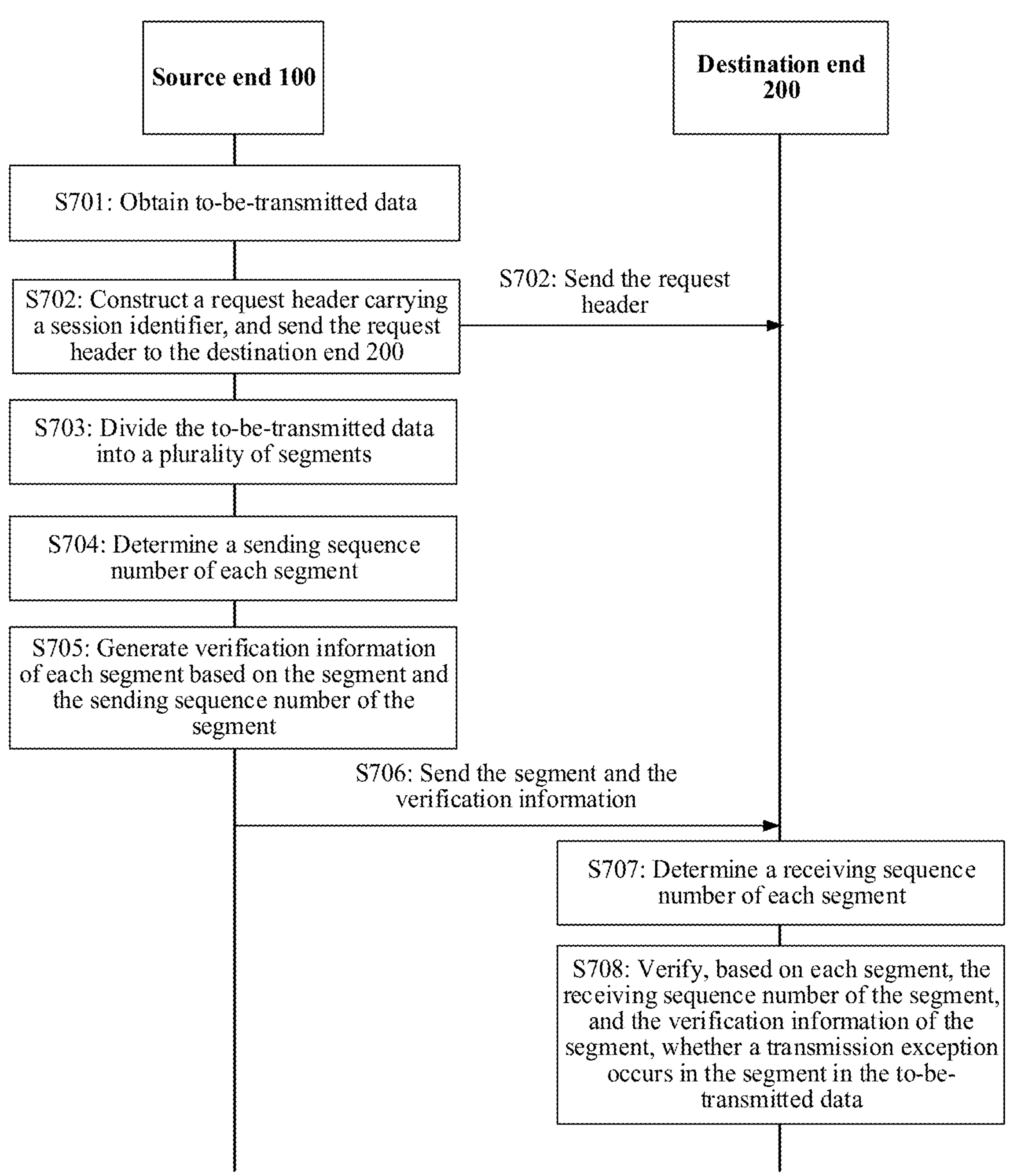
FIG. 7 is a schematic flowchart of data transmission between a source end and a destination end according to an embodiment of this disclosure.

Refer to a flowchart of a data transmission method shown in FIG. 7. The method is applied to the foregoing data transmission system. The data transmission system includes a source end 100 and a destination end 200. The method includes the following steps.

S701: The source end 100 obtains to-be-transmitted data.

In actual application, one or more applications may be run on the source end 100, and the applications may generate data that needs to be transmitted to the destination end 200. For example, when the destination end 200 is an object storage service (OBS) provided by a cloud platform, users may upload data to an OBS bucket through a client on the source end 100, or the client periodically uploads user data to the bucket. In this case, the data to be uploaded by the client is the to-be-transmitted data in this embodiment.

S702: The source end 100 constructs a request header carrying a session identifier, and sends the request header to the destination end 200.

In actual application, an attacker may exchange data in different sessions in a data transmission process, so that data received by the destination end 200 is not data actually sent by the source end 100. Therefore, in this embodiment, a current session identifier may be first transmitted to the destination end 200, so that the destination end subsequently verifies received data based on the session identifier.

In a further possible implementation, the source end 100 may further send verification information corresponding to the request header to the destination end, so that the destination end 200 performs information verification on the received request header by using the verification information, to determine whether information carried in the request header is tampered with in a transmission process.

S703: The source end 100 divides the to-be-transmitted data into a plurality of segments.

In a specific implementation, the source end 100 may equally divide the to-be-transmitted data at a fixed size. In this case, sizes of all segments may be the same, and a size of the last segment may be the same as or different from sizes of other segments. However, in another example, alternatively, the plurality of segments obtained by the source end 100 through division may have different sizes. In this embodiment, a specific implementation of how the source end 100 divides the to-be-transmitted data is not limited.

S704: The source end 100 determines a sending sequence number of each segment.

In an example, the source end 100 may use a sequence number of a segment in the to-be-transmitted data as a sending sequence number of the segment. For example, the first segment obtained by the source end 100 through division may be sent first to the destination end, the second segment obtained by the source end 100 through division may be sent second to the destination end, and so on. Certainly, in another example, the sending sequence number of each segment may also be different from an arrangement sequence number of the segment in the to-be-transmitted data. This is not limited in this embodiment.

S705: The source end 100 generates verification information of each segment based on the segment and the sending sequence number of the segment.

The verification information may be a digital signature corresponding to the segment, or may be an HMAC. The source end 100 may generate the verification information corresponding to each segment based on a combination of the segment, the sending sequence number of the segment, and an encryption key prestored at the source end 100. For a specific implementation, refer to related descriptions in the foregoing embodiments. Details are not described herein again.

S706: The source end 100 sends the plurality of segments and verification information corresponding to the plurality of segments to the destination end.

For one piece of to-be-transmitted data, the source end 100 may start a transmission thread, and send the to-be-transmitted data to the destination end 200 through the transmission system. In actual application, the source end 100 may simultaneously start a plurality of transmission threads, and separately transmit different to-be-transmitted data to the destination end 200 through the plurality of transmission threads. Specific implementation processes in which the source end 100 transmits pieces of to-be-transmitted data to the destination end 200 by using transmission threads may be similar.

Particularly, when the source end 100 needs to transmit a to-be-transmitted resource to the destination end 200, the source end 100 may divide the to-be-transmitted resource into a plurality of pieces of different to-be-transmitted data, and separately transmit the different to-be-transmitted data by using different transmission threads. In this way, parallel transmission of the to-be-transmitted resource between the source end 100 and the destination end 200 can be implemented, and resource transmission efficiency can be effectively improved.

It should be noted that, to reduce a possibility that the attacker may learn of a sending sequence number of a segment, the source end 100 does not transmit the sending sequence number of the segment to the destination end 200. In this way, the attacker cannot learn of the sending sequence number of the segment, and therefore it is difficult for the attacker to attack verification information of the segment.

Further, to facilitate integration of a plurality of pieces of to-be-transmitted data by the destination end 200, the source end 100 may send, to the destination end, description data corresponding to each piece of to-be-transmitted data. The description data may be, for example, an identifier and/or a slice range of a resource to which the to-be-transmitted data belongs. In this case, the destination end 200 may integrate a plurality of pieces of received different to-be-transmitted data based on the description data, and obtain an entire to-be-transmitted resource through integration. For example, the description data may be carried in the foregoing request header, or certainly may be sent separately. This is not limited in this embodiment.

S707: The destination end 200 determines a receiving sequence number of each segment.

S708: The destination end 200 verifies, based on each segment, the receiving sequence of the segment, and the verification information of the segment, whether a transmission exception exists in the segment in the to-be-transmitted data.

When receiving a segment and verification information corresponding to the segment, the destination end 200 may record a receiving sequence number of the segment, and verify the received segment by using the receiving sequence number of the segment and based on the segment and the verification information of the segment, to determine whether a transmission exception exists in the segment in a transmission process.

It should be noted that, in a process in which the source end 100 and the destination end 200 transmit a plurality of segments, a sending sequence number of a segment at the source end 100 is consistent with a receiving sequence number of the segment at the destination end 200.

In a specific implementation, the destination end 200 may verify whether a transmission exception exists in a received segment by performing a corresponding operation on the received segment, a receiving sequence number of the segment, a key, and received verification information. For a specific verification process, refer to the related descriptions in the foregoing embodiments. Details are not described herein again.

In actual application, the source end 100 may transmit a segment to the destination end 200 one by one, and after completing verification on a currently received segment, the destination end 200 indicates the source end 100 to transmit a next segment to the destination end 200. In this way, when a transmission exception exists in any segment in the transmission process, the destination end 200 may discover the transmission exception in time through a verification process of the segment, so that verification efficiency can be improved. Further, when determining that an exception occurs in a segment, the destination end 200 may disconnect from the source end 100, or indicate the source end 100 to retransmit the segment.

In some possible implementations, to facilitate notifying the destination end 200 that a plurality of segments currently transmitted are all segments, the source end 100 may send an end identifier to the destination end 200. The end identifier identifies the last segment transmitted by the source end 100 to the destination end 200. In this way, the destination end 200 may determine, based on the end identifier, that the plurality of currently received segments are all the segments sent by the source end 100. In addition, when the plurality of segments are truncated by the attacker in the transmission process, the destination end 200 may determine whether the destination end 200 receives all the segments sent by the source end 100 based on whether the destination end 200 receives the end identifier sent by the source end 100 or a value of the end identifier sent by the source end 100. Therefore, when the attacker truncates a partial segment, the destination end 200 can discover the attack in time.

Figure 8:
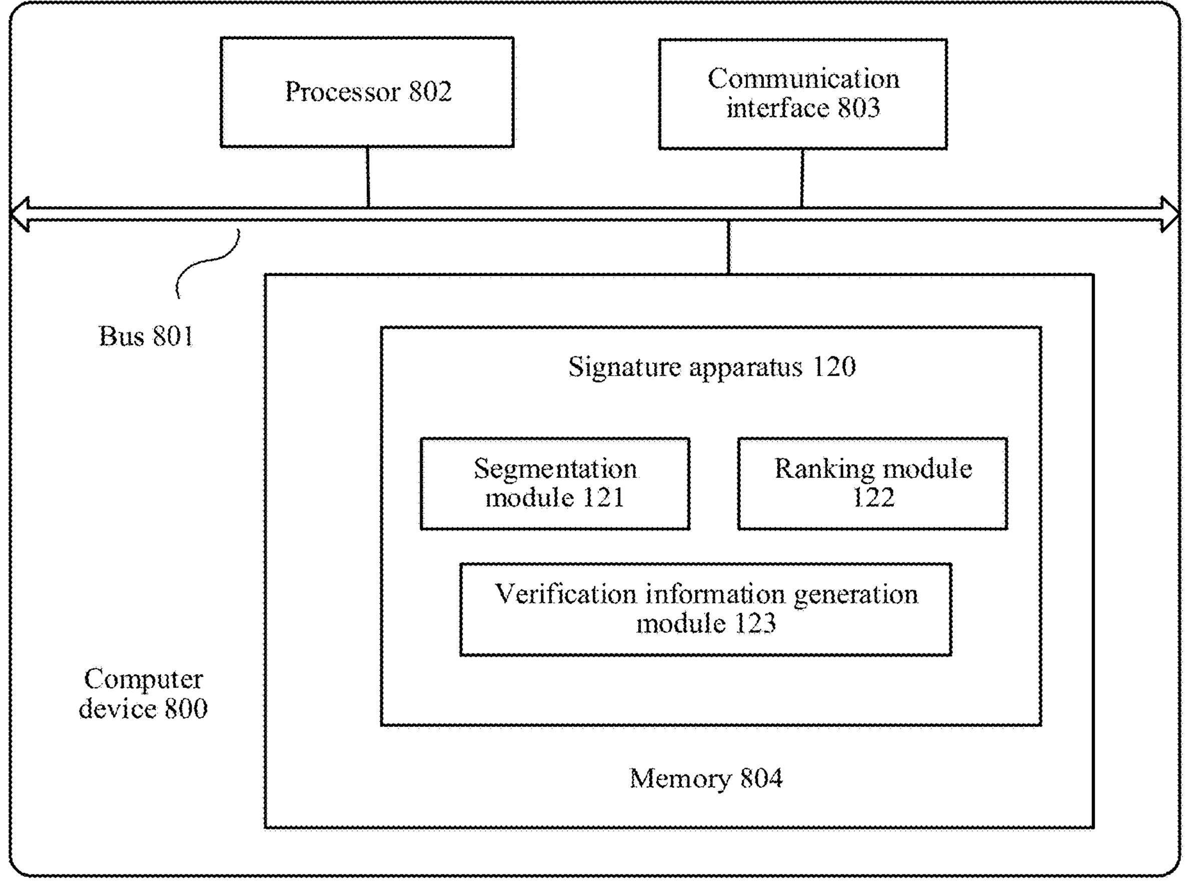
FIG. 8 is a schematic diagram of a hardware structure of a computer device according to an embodiment of this disclosure.
Figure 9:
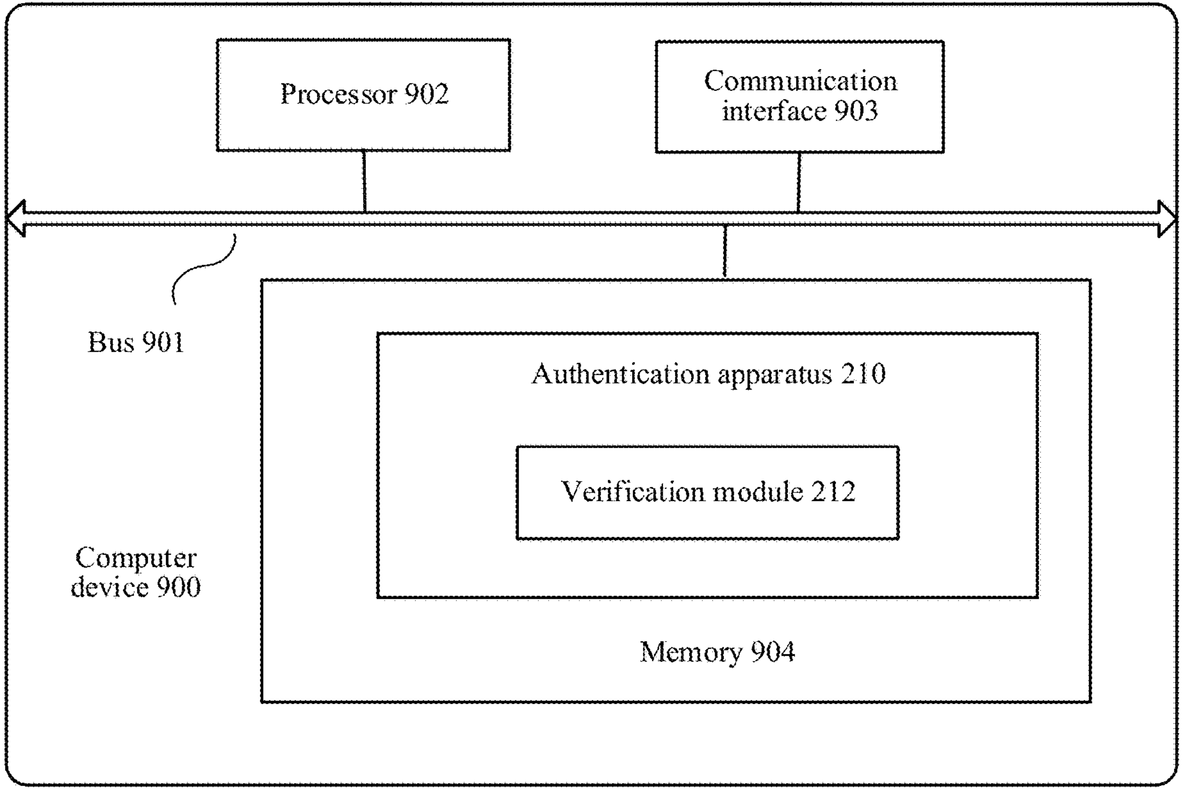
FIG. 9 is a schematic diagram of a hardware structure of another computer device according to an embodiment of this disclosure.

FIG. 8 and FIG. 9 each provide a computer device. The computer device 800 shown in FIG. 8 may be configured to implement functions of the signature apparatus 120 in the source end 100 in the embodiment shown in FIG. 2. The computer device 900 shown in FIG. 9 may be configured to implement functions of the authentication apparatus 210 in the destination end 200 in the embodiment shown in FIG. 2.

The computer device 800 includes a bus 801, a processor 802, a communication interface 803, and a memory 804. The processor 802, the memory 804, and the communication interface 803 communicate with each other through the bus 801. When the computer device 800 implements the embodiments shown in FIG. 2 and FIG. 7, and the signature apparatus 120 in the source end 100 described in the embodiments of FIG. 2 and FIG. 7 is implemented by using software, software or program code required for performing functions of the segmentation module 121, the ranking module 122, and the verification information generation module 123 in the signature apparatus 120 is stored in the memory 804. Functions of the transmission module 124 may be implemented through the communication interface 803, and the processor 802 is configured to execute the instructions in the memory 804, to implement the method performed by the signature apparatus 120.

The computer device 900 includes a bus 901, a processor 902, a communication interface 903, and a memory 904. The processor 902, the memory 904, and the communication interface 903 communicate with each other through the bus 901. When the computer device 900 implements the embodiments shown in FIG. 2 and FIG. 7, and the authentication apparatus 210 in the destination end 200 described in the embodiments of FIG. 2 and FIG. 7 is implemented by using software, software or program code required for performing functions of the verification module 212 in the authentication apparatus 210 is stored in the memory 904. Functions of the transmission module 211 may be implemented through the communication interface 903, and the processor 902 is configured to execute the instructions in the memory 904, to implement the method performed by the authentication apparatus 210.

In addition, an embodiment of this disclosure further provides a computer-readable storage medium. The computer-readable storage medium stores instructions. When the instructions are run on a computer device, the computer device is enabled to perform the method performed by the source end 100 in the foregoing embodiments.

An embodiment of this disclosure further provides another computer-readable storage medium. The computer-readable storage medium stores instructions. When the instructions are run on a computer device, the computer device is enabled to perform the method performed by the destination end 200 in the foregoing embodiments.

An embodiment of this disclosure further provides a computer program product. When the computer program product is executed by a computer, the computer performs any one of the foregoing data transmission methods. The computer program product may be a software installation package. If any one of the foregoing data provision methods needs to be used, the computer program product may be downloaded, and the computer program product may be executed on a computer.

In addition, it should be noted that the described apparatus embodiment is merely an example. The units described as separate parts may or may not be physically separate, and parts displayed as units may or may not be physical units, may be located in one position, or may be distributed on a plurality of network units. Some or all the modules may be selected according to actual needs to achieve the objectives of the solutions of embodiments. In addition, in the accompanying drawings of the apparatus embodiments provided by this disclosure, connection relationships between modules indicate that the modules have communication connections to each other, which may be implemented as one or more communication buses or signal cables.

Based on the description of the foregoing implementations, a person skilled in the art may clearly understand that this disclosure may be implemented by software in addition to necessary universal hardware, or by dedicated hardware, including a dedicated integrated circuit, a dedicated central processing unit (CPU), a dedicated memory, a dedicated component, and the like. Generally, any functions that can be performed by a computer program can be easily implemented by using corresponding hardware. Moreover, a specific hardware structure used to achieve a same function may be in various forms, for example, in a form of an analog circuit, a digital circuit, or a dedicated circuit. However, as for this disclosure, software program implementation is a better implementation in most cases. Based on such an understanding, the technical solutions of this disclosure essentially or the part contributing to the other technologies may be implemented in a form of a software product. The computer software product is stored in a readable storage medium, such as a floppy disk, a Universal Serial Bus (USB) flash drive, a removable hard disk, a read-only memory (ROM), a random-access memory (RAM), a magnetic disk, or an optical disc of a computer, and includes several instructions for instructing a computer device (which may be a personal computer, a training device, or a network device) to perform the methods in embodiments of this disclosure.

All or some of the foregoing embodiments may be implemented by using software, hardware, firmware, or any combination thereof. When software is used for implementation, the embodiments may be implemented completely or partially in a form of a computer program product.

The computer program product includes one or more computer instructions. When the computer program instructions are loaded and executed on the computer, the procedure or functions according to embodiments of this disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, training device, or data center to another website, computer, training device, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a training device or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

What is claimed is:

1. A method, comprising:

obtaining to-be-transmitted data;

dividing the to-be-transmitted data into segments;

obtaining a sending sequence of the segments;

generating, for a target segment of the segments, verification information based on the target segment, an identifier of a session, and a sending sequence number of the target segment; and sending, to a destination end via a computer network and without sending the sending sequence number of the target segment to the destination end, the identifier, the segments, and the verification information for the target segment, wherein the identifier, the target segment, the verification information, and a receiving sequence number corresponding to the sending sequence number of the target segment are configured to verify whether a transmission exception occurs in the target segment in a transmission process by the destination end without receiving the sending sequence number of the target segment, and wherein the destination end is a receiver of the to-be-transmitted data in a session process via the computer network.

2. The method of claim 1, wherein generating the verification information comprises:

performing, for the target segment, a hash-based message authentication code (HMAC) operation on a combination of the target segment, the identifier, the sending sequence number of the target segment, and a key to obtain the verification information.

3. The method of claim 1, wherein before sending the segments and the verification information, the method further comprises:

sending, to the destination end, a request header carrying the identifier.

4. The method of claim 1, wherein sending the identifier, the segments, and the verification information comprises:

sending, to the destination end, an end identifier, and wherein the end identifier indicates that transmission of the segments is completed.

5. The method of claim 1, wherein before obtaining the to-be-transmitted data, the method further comprises:

starting a plurality of transmission threads;

obtaining a to-be-transmitted resource; and dividing the to-be-transmitted resource into a plurality of pieces of the to-be-transmitted data, and wherein sending the segments and the verification information comprises sending, to the destination end, at least one of the plurality of pieces of the to-be-transmitted data through one of the plurality of transmission threads.

6. The method of claim 5, wherein before sending a first segment of the at least one of the plurality of pieces of the to-be-transmitted data, the method further comprises:

sending, to the destination end, a request header carrying description data, and wherein the description data comprises an identifier of the to-be-transmitted resource or a slice range of the to-be-transmitted data.

7. A method, comprising:

receiving, from a source end via a computer network and without receiving a sending sequence number of a target segment from the source end, an identifier of a session, segments, and verification information for the target segment of the segments, wherein the segments are from to-be-transmitted data, wherein the verification information for the target segment is generated based on the identifier, the target segment, and the sending sequence number of the target segment, and wherein the source end is a transmitter of the to-be-transmitted data in a session process via the computer network;

obtaining a receiving sequence number of each target segment of the segments, wherein the sending sequence number of the target segment is not obtained; and verifying, based on the target segment, the receiving sequence number of the target segment, the identifier, and the verification information of the target segment, whether a transmission exception exists in the target segment.

8. The method of claim 7, wherein the verification information comprises a hash-based message authentication code (HMAC), and wherein verifying whether the transmission exception exists comprises verifying, based on a key, whether the transmission exception exists.

9. The method of claim 7, wherein receiving the identifier comprises:

receiving, from the source end, a request header carrying the identifier.

10. The method of claim 7, wherein receiving the identifier, the segments, and the verification information comprises:

receiving, from the source end, an end identifier, and wherein the end identifier indicates that transmission of the segments is completed.

11. The method of claim 7, wherein receiving the identifier, the segments, and the verification information comprises:

receiving, from the source end and through a transmission thread, a piece of the to-be-transmitted data.

12. The method of claim 11, wherein before receiving the piece of the to-be-transmitted data, the method further comprises:

receiving, from the source end, a request header carrying description data, and wherein the description data comprises an identifier of a to-be-transmitted resource or a slice range of the to-be-transmitted data.

13. An apparatus, comprising:

a memory comprising instructions; and a processor coupled to the memory and configured to execute the instructions to:

obtain to-be-transmitted data;

divide the to-be-transmitted data into segments;

obtain a sending sequence of the segments;

generate, for a target segment of the segments, verification information based on the target segment, an identifier of a session, and a sending sequence number of the target segment; and send, to a destination end via a computer network and without the sending sequence number of the target segment being sent to the destination end, the identifier, the segments, and the verification information for the target segment, wherein the identifier, the target segment, the verification information, and a receiving sequence number corresponding to the sending sequence number of the target segment are configured to verify whether a transmission exception occurs in the target segment in a transmission process by the destination end without receiving the sending sequence number of the target segment, and wherein the destination end is a receiver of the to-be-transmitted data in a session process via the computer network.

14. The apparatus of claim 13, wherein the processor is further configured to execute the instructions to perform, for the target segment, a hash-based message authentication code (HMAC) operation on a combination of the target segment, the identifier, the sending sequence number, and a key to obtain the verification information.

15. The apparatus of claim 13, wherein the processor is further configured to:

send, to the destination end, an end identifier, and wherein the end identifier indicates that transmission of the segments is completed.

16. The apparatus of claim 13, wherein before the to-be-transmitted data is being obtained, the processor is further configured to:

start a plurality of transmission threads;

obtain a to-be-transmitted resource;

divide the to-be-transmitted resource into a plurality of pieces of the to-be-transmitted data; and send, to the destination end, at least one of the plurality of pieces of the to-be-transmitted data through one of the plurality of transmission threads.

17. An apparatus, comprising:

a memory configured to store instructions; and a processor coupled to the memory and configured to execute the instructions to:

receive, from a source end via a computer network and without a sending sequence number of a target segment being received from the source end, an identifier of a session, segments, and verification information for the target segment of the segments, wherein the segments are from to-be-transmitted data, wherein the verification information for the target segment is generated based on the identifier, the target segment, and the sending sequence number of the target segment, and wherein the source end is a transmitter of the to-be-transmitted data in a session process via the computer network;

obtain a receiving sequence number of each target segment of the segments, wherein the sending sequence number of the target segment is not obtained; and verify, based on the target segment, the receiving sequence number of the target segment, the identifier, and the verification information of the target segment, whether a transmission exception exists in the target segment.

18. The apparatus of claim 17, wherein the verification information comprises a hash-based message authentication code (HMAC), and wherein the processor is further configured to execute the instructions to verify, based on a key, whether the transmission exception exists.

19. The apparatus of claim 17, wherein the processor is further configured to:

receive, from the source end, an end identifier, and wherein the end identifier indicates that transmission of the segments is completed.

* * * * *